No. 821,027. PATENTED MAY 22, 1906.
H. DOCK.
CONNECTION FOR MACHINES AND PARTS THEREOF.
APPLICATION FILED MAY 11, 1905.
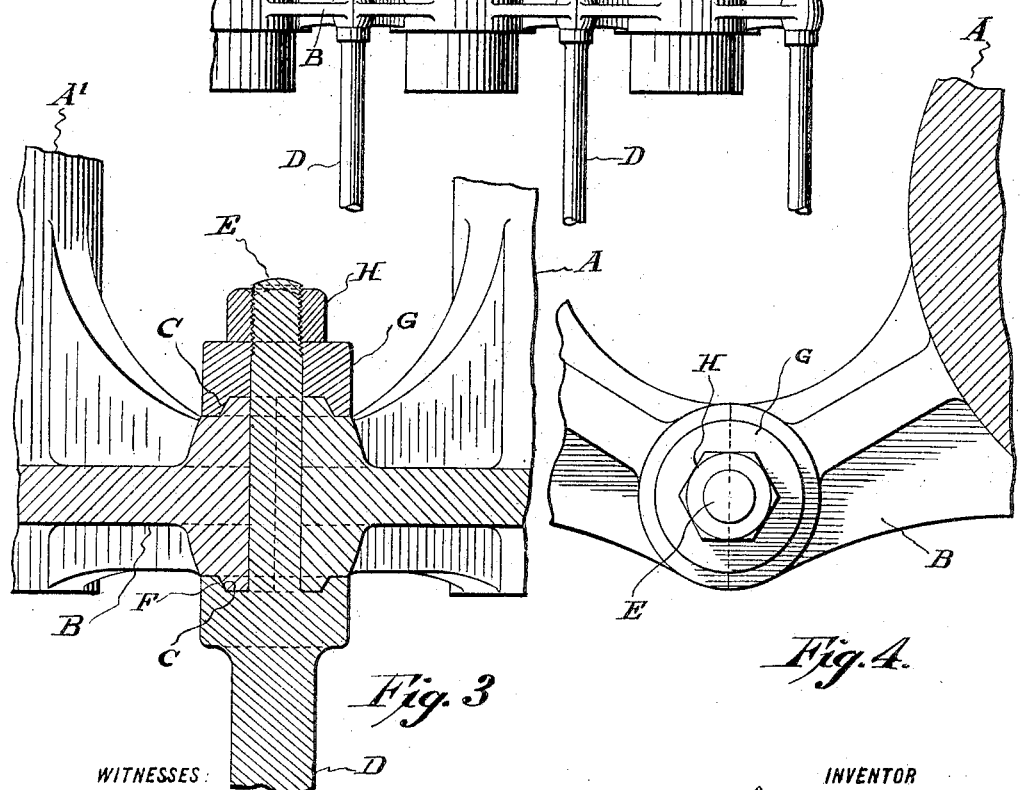
INVENTOR
Herman Dock
BY
Harding & Harding
ATTORNEYS

UNITED STATES PATENT OFFICE.

HERMAN DOCK, OF PHILADELPHIA, PENNSYLVANIA.

CONNECTION FOR MACHINES AND PARTS THEREOF.

No. 821,027. Specification of Letters Patent. Patented May 22, 1906.

Application filed May 11, 1905. Serial No. 260,028.

*To all whom it may concern:*

Be it known that I, HERMAN DOCK, a citizen of the United States, residing at Philadelphia, county of Philadelphia, and State of Pennsylvania, have invented a new and useful Improvement in Connections for Machines and Parts Thereof, of which the following is a full, clear, and exact description, reference being had to the accompanying drawings, which form a part of this specification.

My invention has for its object an improved connection for connecting machines, such as engines, or parts thereof, such as cylinders, together and to a support in such manner that they will be firmly held together and on the support.

My invention is particularly adapted for connecting the cylinders of explosive-engines of the multicylinder type for the purpose of connecting the cylinders together and yet so connecting them that they may readily be separated one from the other.

I will describe my invention as applied to the connection of two gas-engine cylinders, although, as stated before, the invention is not limited to the connection between two gas-engine cylinders.

In the drawings, Figure 1 represents a plan view. Fig. 2 represents a front elevation. Fig. 3 is a section through the flange B, showing means of coupling. Fig. 4 is a plan view of flange, showing coupling.

A A' A² are explosive-engine cylinders, each of which is provided with the flange or boss B. The outer end of this boss or flange B is curved in cross-section and is of the shape shown in Fig. 3, having a semifrustoconical projection C at top and bottom. D is the column or support for a pair of cylinders. From the upper portion of this column extends the rod E. On the upper surface of this column D and around the rod E is formed the pocket or seat F, which corresponds to the bottom projections C. The parts are assembled as follows: Two cylinders are brought together until the curved faces of the bosses on flanges B meet around the rod E, with the lower projections C in the pocket or seat F. A washer G is then placed on the upper surface of the flange or boss B. This washer has a central orifice through which the rod E extends. In the washer is a seat or pocket corresponding to the upper projections C. The upper end of the rod E is threaded, and a nut H works thereon. By assembling the parts as described and turning the nut the two cylinders are brought together and firmly clamped together upon the column D. The parts can readily be separated by merely loosening the nut and lifting the upper washer.

Having now fully described my invention, what I claim, and desire to protect by Letters Patent, is—

1. As a means for connecting two machines or parts thereof together and to support the same, in combination, a flange for each of the parts to be connected together, each flange having a projecting portion, a column having a projecting rod, said flanges being abutted together around said rod, there being a pocket or seat in said column conforming to the projecting portion of said flanges and means to secure said projecting portion in said pocket.

2. As a means for connecting two machines or parts thereof together and to a support, in combination, a flange for each of the parts to be connected together, each flange having an upper and lower projecting portion, a column having a projecting rod, said flanges being abutted together around said rod, there being a pocket or seat in said column conforming to the lower projecting portions of said flanges, a washer having an orifice through which said rod passes, said washers having a pocket or seat conforming to the upper projecting portions of said flanges, and means to secure said projecting portions in their pockets.

3. As a means for connecting two machines or parts thereof together and to a support, in combination, a flange for each of the parts to be connected together, each flange having a conical projecting portion, a column having a projecting rod, said flanges being abutted together around said rod, there being a pocket or seat in said column conforming to the projecting portion of said flanges and means to secure said projecting portions in said pockets.

4. As a means for connecting two machines or parts thereof together and to a support, in combination, a flange for each of the parts to be connected together, each flange having an upper and lower conical projecting portion, a column having a projecting rod, said flanges being abutted together around said rod, there being a pocket or seat in said column conforming to the lower projecting portions of said flanges, a washer having an orifice through which said rod passes, said washer having a pocket or seat conforming to the upper projecting portions of said flanges, and means to secure said projecting portions in their respective pockets 5. As a means for connecting two machines or parts thereof together and to support the same, in combination, a flange for each of the parts to be connected together, each flange having a projecting portion, a column having a projecting rod, said flanges being abutted together around said rod, there being a pocket or seat in said column conforming to the projecting portion of said flanges and a nut adapted to be forced against the upper end of said flanges.

6. As a means for connecting two machines or parts thereof together and to a support, in combination, a flange for each of the parts to be connected together, each flange having an upper and lower projecting portion, a column having a projecting rod, said flanges being abutted together around said rod, there being a pocket or seat in said column conforming to the lower projecting portions of said flanges, a washer having an orifice through which said rod passes, said washers having a pocket or seat conforming to the upper projecting portions of said flanges, the upper portion of said rod being threaded and a nut working thereon above said washer.

7. As a means for connecting two machines or parts thereof together and to a support, in combination, a flange for each of the parts to be connected together, each flange having a conical projecting portion, a column having a projecting rod, said flanges being abutted together around said rod, there being a pocket or seat in said column conforming to the projecting portion of said flanges and a nut adapted to be forced against the upper end of said flanges.

8. As a means for connecting two machines or parts thereof together and to a support, in combination, a flange for each of the parts to be connected together, each flange having an upper and lower conical projecting portion, a column having a projecting rod, said flanges being abutted together around said rod, there being a pocket or seat in said column conforming to the lower projecting portions of said flanges, a washer having an orifice through which said rod passes, said washer having a pocket or seat conforming to the upper projecting portions of said flanges, the upper portion of said rod being threaded and a nut working thereon above said washer.

In testimony of which invention I have hereunto set my hand, at Philadelphia, on this 3d day of May, 1905.

HERMAN DOCK.

Witnesses:
S. E. PATTERSON,
M. M. HAMILTON.